United States Patent

Suh et al.

(10) Patent No.: US 9,263,759 B2
(45) Date of Patent: Feb. 16, 2016

(54) END PLATE FOR FUEL CELL INCLUDING ANTI-BENDING PLATE

(75) Inventors: Jung Do Suh, Seoul (KR); Sae Hoon Kim, Yongin (KR); Byung Ki Ahn, Seongnam (KR); Jin Yong Park, Incheon (KR); Ji Yong Kim, Incheon (KR)

(73) Assignees: Hyundai Motor Company, Seoul (KR); Kia Motors Corporation, Seoul (KR); Daewon Kang Up Co., Ltd., Seoul (KR)

( * ) Notice: Subject to any disclaimer, the term of this patent is extended or adjusted under 35 U.S.C. 154(b) by 0 days.

(21) Appl. No.: 13/312,726

(22) Filed: Dec. 6, 2011

(65) Prior Publication Data

US 2013/0059227 A1 Mar. 7, 2013

(30) Foreign Application Priority Data

Sep. 7, 2011 (KR) .................. 10-2011-0090573

(51) Int. Cl.
*H01M 2/00* (2006.01)
*H01M 8/24* (2006.01)
*H01M 8/10* (2006.01)

(52) U.S. Cl.
CPC ............. *H01M 8/248* (2013.01); *H01M 8/245* (2013.01); *H01M 2008/1095* (2013.01); *Y02E 60/50* (2013.01)

(58) Field of Classification Search
CPC .............. H01M 2008/1095; H01M 8/245; H01M 8/248; Y02E 60/50
USPC .................. 429/452, 482, 507, 508
See application file for complete search history.

(56) References Cited

U.S. PATENT DOCUMENTS

| 2006/0014319 A1 | 1/2006 | Jeung et al. |
| 2006/0141319 A1* | 6/2006 | Hu et al. .................. 429/34 |
| 2006/0204824 A1 | 9/2006 | Mazza et al. |
| 2010/0009223 A1* | 1/2010 | Blanchet et al. ............. 429/17 |
| 2010/0227243 A1* | 9/2010 | Jung et al. ................. 429/458 |

FOREIGN PATENT DOCUMENTS

| JP | 10-270066 | 10/1998 |
| JP | 11-265965 A | 9/1999 |
| JP | 2005-167242 A | 6/2005 |
| JP | 2006-147511 A | 6/2006 |
| JP | 2007-038490 A | 2/2007 |
| JP | 2009-117326 A | 5/2009 |
| KR | 10-0757131 | 9/2007 |
| KR | 10-0901563 | 3/2009 |
| KR | 10-2011-0059990 | 6/2011 |
| TW | 201034279 A | 9/2010 |

* cited by examiner

*Primary Examiner* — Jonathan Jelsma
*Assistant Examiner* — Omar Kekia
(74) *Attorney, Agent, or Firm* — Mintz Levin Cohn Ferris Glovsky and Popeo, P.C.; Peter F. Corless (57) ABSTRACT

Disclosed is an end plate for a fuel cell including an anti-bending plate, in which an anti-bending plate is assembled with an insert having a sandwich structure and the insert is injection molded, thereby easily preventing the insert from being bent due to an injection molding pressure. In the disclosed end plate, a sandwich insert including two or more stacked plates each having a specific shape is manufactured, and an anti-bending plate is coupled to the sandwich insert and then is injection molded, thereby easily preventing the sandwich insert from being bent due to a resin pressure in the injection molding process, contrary to a conventional integral metal insert.

10 Claims, 10 Drawing Sheets

PRIOR ART

FIG.10

END PLATE FOR FUEL CELL INCLUDING ANTI-BENDING PLATE

CROSS-REFERENCE TO RELATED APPLICATION

This application claims under 35 U.S.C. §119(a) the benefit of Korean Patent Application No. 10-2011-0090573 filed Sep. 7, 2011, the entire contents of which are incorporated herein by reference.

BACKGROUND (a) Technical Field

The present invention relates to an end plate for a fuel cell including an anti-bending plate. More particularly, it relates to an end plate for a fuel cell including an anti-bending plate, in which an anti-bending plate is assembled with an insert having a sandwich-like structure and the insert is injection molded, thereby easily preventing the insert from being bent due to an injection molding pressure.

(b) Background Art

Figure 10:
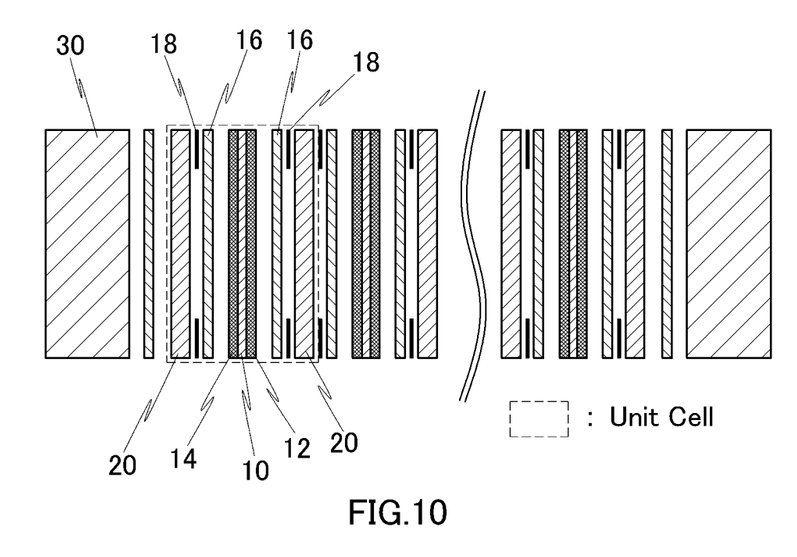
FIG. 10 is a view schematically illustrating a fuel cell stack.

Referring to FIG. 10, in a unit cell of a fuel cell stack mounted on a fuel cell vehicle, a Membrane-Electrode Assembly (MEA) is located at the innermost side of the unit cell of the fuel cell stack. The MEA includes a solid polymer electrolyte membrane 10 through which protons pass and catalytic electrode layers, i.e., a cathode 12 and an anode 14, coated on opposite surfaces of the solid polymer electrolyte membrane 10 such that hydrogen can react with oxygen. Gas Diffusion Layers (GDL) 16 and gaskets 18 are sequentially staked outside the cathode 12 and the anode 14, and separation plates 20 including flow fields for supplying fuel and discharging water generated by the reaction are located outside the GDLs 16.

After several hundred unit cells are stacked, end plates 30 for supplying and fixing each of the unit cells are assembled at the outermost sides of the fuel cell stack. In this case, a current collector plate for collecting electricity generated in the fuel cell stack and sending the collected electricity to outside of the fuel cell stack is mounted inside the end plates 30.

An oxidation reaction of hydrogen occurs in the anode 14 of the fuel cell stack and protons and electrons are generated by the reaction. At this time, the generated protons and electrons flow to the cathode 12 respectively through the solid polymer electrolyte membrane 10 and the separation plate 20, so that water is generated in the cathode 12 through an electrochemical reaction of the protons and electrons from the anode 14 with oxygen in the air and electrical energy, finally generated through flow of the electrons, is supplied to a load requiring electrical energy through the current collector plate of the end plates 30.

The end plates 30 of the fuel cell stack serve to fasten a plurality of stacked separation plates, MEAs, and GDLs and simultaneously serve to provide a uniform surface pressure to each unit cell from opposite sides of the fuel cell stack respectively.

Figure 9:
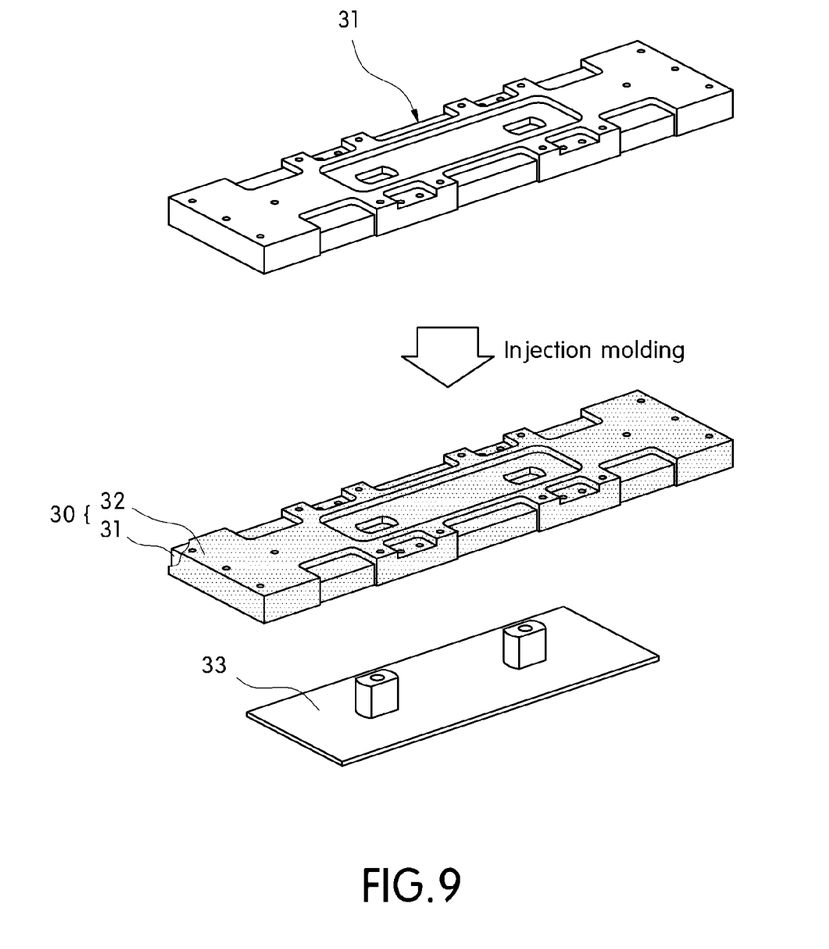
FIG. 9 is a perspective view illustrating a conventional end plate.

As can be seen in FIG. 9, the end plate 30 is formed with a metal insert 31, a plastic injection molded body 32, and a current collector plate 33, which are integrally formed, for weight reduction and electrical insulation. That is, the metal insert 31 is disposed inside an injection mold and then a plastic injection molding material is filled in the injection mold, thereby embodying the end plate 30 including the metal insert 31 surrounded by the plastic injection molded body 32.

In the meantime, the current collector plate 33 is disposed inside the injection mold together with the metal insert 31 and is injection molded together with the plastic injection molded body 32 or separately assembled inside the plastic injection molded body 32 later.

The metal insert of the end plate is required to have a high strength to resist an inner surface pressure. Accordingly, the metal insert is generally manufactured through machining of a metal material and also is manufactured in a complex shape to collect generated electricity from reactions within the fuel cell stack and fasten the fuel cell stack together securely.

However, a conventional metal insert of the end plate is manufactured in an integral shape, so that it has the following disadvantages:

First, in machining a material-reduction structure for weight reduction of the metal insert, it is difficult to perform injection molding for the metal insert. That is, a recess or an uneven portion should not be generated on a resin surface after the injection molding of the end plates, for assuring continuous contact with the gaskets to prevent a fuel leak. However, in applying the material-reduction structure to the metal insert, if a thickness of the resin material of the plastic injection molded body is not uniform, a recess or an uneven portion is disadvantageously generated on the surface of the resin due to the resin's contraction. In particular, if a pocket processing is performed to apply the material-reduction structure to the integral metal insert for reducing the weight, it is difficult to uniformly maintain the thickness of the injection molding material.

Second, the integral metal insert is manufactured by cutting a metal plate or a non-metal plate through machining, so it takes a long time to manufacture a single integral metal insert, thereby making it difficult to mass produce and reduce costs accordingly.

Third, the integral metal insert should be made of a single material. Therefore, applying different materials for weight reduction and strength improvement is also difficult.

In this respect, contrary to a conventional integral metal insert, a sandwich insert in which two or more plates each having a specific shape are stacked has been manufactured to maintain strength and simultaneously promote weight reduction. However, since the sandwich insert employs the centrally disposed plate having material-reduction spaces among several plates of the sandwich insert, the central portion of the sandwich insert is often bent due to resin pressure in the injection molding process for surrounding the sandwich insert with the plastic injection molded body.

SUMMARY OF THE DISCLOSURE

The present invention provides an end plate for a fuel cell including an anti-bending plate, in which a sandwich insert including two or more stacked plates each having a specific shape are combined, and an anti-bending plate is coupled to the sandwich insert and then is injection molded, thereby easily preventing the sandwich insert from being bent due to a resin pressure in the injection molding process, contrary to a conventional integral metal insert.

In one aspect, the present invention provides an end plate for a fuel cell including an anti-bending plate, the end plate including: a sandwich insert in which a plurality of plates having manifold forming portions at opposite ends thereof are bonded by a bonding means, wherein an anti-bending plate that is in close contact with a surface of an injection mold are coupled to a surface of the sandwich insert opposite to where a resin pressure is directly applied in an injection molding and a plastic injection molded body is injection molded, so that the sandwich insert to which the resin pressure can be applied within the injection mold is supported by the anti-bending plate.

In a first exemplary embodiment, the anti-bending plate has a first large diameter portion and a second smaller diameter portion which has a same thickness and is integrally formed therewith. A lower surface of the large diameter portion is in close contact with an outer surface of an outermost plate located at an outermost side of the sandwich insert to be injection molded, and a stepped portion between the large diameter portion and the small diameter portion is injection molded by the plastic injection molded body to be locked thereby.

In a second exemplary embodiment, the anti-bending plate has a large diameter portion and a small diameter portion which are integrally formed, the large diameter portion being thicker than a small diameter portion, a lower end of the large diameter portion is inserted into a coupling recess formed on an outer surface of an outermost plate located at an outermost side of the sandwich insert, and a stepped portion between the large diameter portion and the small diameter portion is injection molded by the plastic injection molded body to be locked thereby.

In a third exemplary embodiment, the anti-bending plate has a large diameter portion and a small diameter portion thicker than the large diameter portion which are integrally formed, the large diameter portion is inserted into a coupling recess formed at an outer surface of an outermost plate located at an outermost side of the sandwich insert, and a stepped portion between the large diameter portion and the small diameter portion is injection molded by the plastic injection molded body to be locked thereby.

In a fourth exemplary embodiment, the anti-bending plate has a large diameter portion and a small diameter portion thicker than the large diameter portion which are integrally formed, a lower end of the large diameter portion is positioned within a positioning recess formed in a second plate located next to an outermost plate of the sandwich insert and the small diameter portion protrudes through a terminal insertion recess formed in the outermost plate at the same time, and a stepped portion between the large diameter portion and the small diameter portion is injection molded by the plastic injection molded body to be locked.

Accordingly, the present invention provides the following effects:

According to the present invention, the sandwich insert including several stacked plates is employed as the insert of the end plate and the anti-bending plate is coupled to the sandwich insert, so that the anti-bending plate serves to support the sandwich insert within the injection mold, thereby preventing the sandwich insert from being bent due to a resin pressure applied to the sandwich insert in the injection molding process.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Hereinafter reference will now be made in detail to various embodiments of the present invention, examples of which are illustrated in the accompanying drawings and described below.

It is understood that the term fuel cell "vehicle" or "vehicular" or other similar term as used herein is inclusive of all types of fuel cell motor vehicles in general such as passenger automobiles including sports utility vehicles (SUV), buses, trucks, various commercial vehicles, watercraft including a variety of boats and ships, aircraft, and the like, and includes hybrid fuel cell vehicles, electric motor powered fuel cell vehicles, auxiliary plug-in fuel cell hybrid electric vehicles, hydrogen-powered fuel cell vehicles and other alternative fuel cell vehicles (e.g., fuels derived from resources other than petroleum).

The present invention provides an end plate for a fuel cell including an insert 100 having a sandwich structure where manifold forming portions for flowing hydrogen, air, and cooling water are formed at opposite ends thereof and a plastic injection molded body 300 is injection molded after surrounding the sandwich insert 100 with a plastic injection molding material. The end plate for the fuel cell of the present invention has a feature in that an anti-bending plate 200 is assembled with the sandwich insert 100 to prevent the sandwich insert 100 from being bent by an injection molding resin pressure in the injection molding process in which the sandwich insert 100 is surrounded with the plastic injection molded body 300.

As illustrated in FIGS. 1, 3, 5, and 7, in the sandwich insert 100, an outermost plate 100 is a first plate having manifold forming portions 102 at opposite ends thereof, and a second plate 120, a third plate 130, and a fourth plate 140 are sequentially stacked and bonded by a bonding means. The second plate 120 has first material-reducing spaces 122 for weight reduction.

The sandwich insert 100 having the above structure is disposed inside an injection mold 400 while being maintained in a floated state and then a plastic resin is injected into a space between an inner surface of the injection mold 400 and an outer surface of the sandwich insert 100, so that the outer surface of the sandwich insert 100 is surrounded by the plastic injection molded body 300 to be injection molded.

In this case, pins (not-shown) are inserted into pin apertures formed at four corners of the sandwich insert 100 disposed inside the injection mold 400 and opposite ends of the pins are in close contact with and supported by an upper surface and a bottom surface of the injection mold at the same time, so that the sandwich insert 100 is maintained in a floated state at a central portion of the injection mold 400. However, since a resin pressure is applied to a central portion of the sandwich when the plastic resin is injected into the injection mold 400 from a lower portion of the injection mold 400, the central portion of the sandwich insert 100 is often finely bent.

Accordingly, the present invention provides an anti-bending plate 200 which is coupled to the sandwich insert 100 to prevent the sandwich insert 100 from being bent. Hereinafter, exemplary embodiments of the anti-bending plate coupled to the sandwich insert of the end plate for the fuel cell according to the present invention will be described.

First Embodiment

Figure 1:
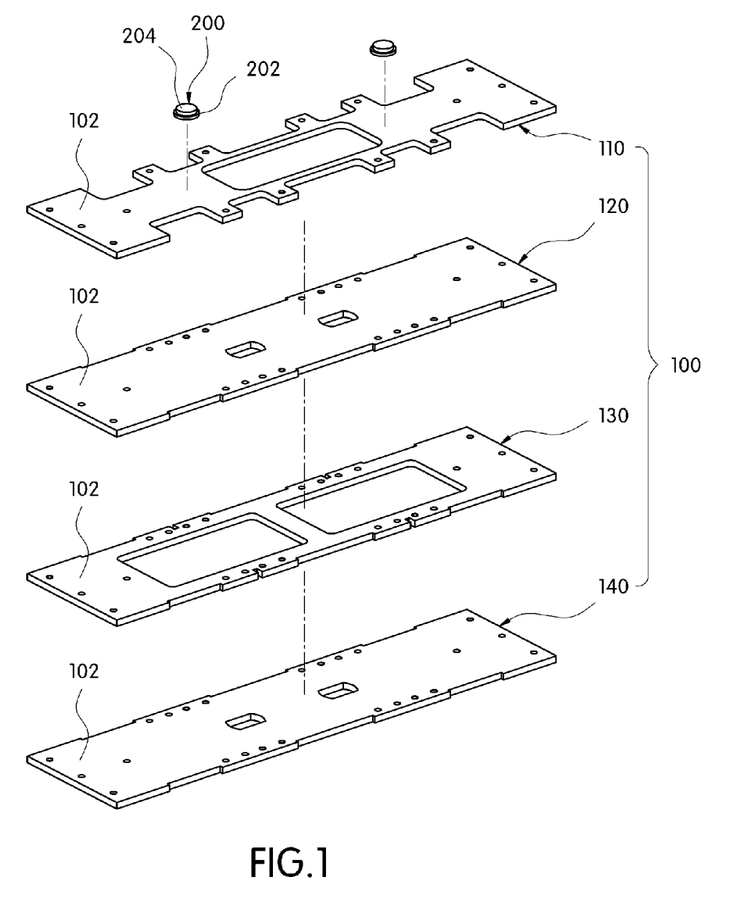
FIG. 1 is an exploded perspective view illustrating a metal insert of an end plate for a fuel cell and an anti-bending plate coupled to the metal insert according to a first exemplary embodiment of the present invention.

As illustrated in FIG. 1, the anti-bending plate 200 according to the first embodiment of the present invention includes a relatively large diameter portion 202 in comparison to a smaller diameter portion 204 which both have the same thickness and are integrally formed therewith. The relatively large diameter portion 202 at a lower side of the anti-bending plate 200 and the small diameter portion 204 at an upper side of the anti-bending plate 200 form a hat-like shape.

Figure 2:
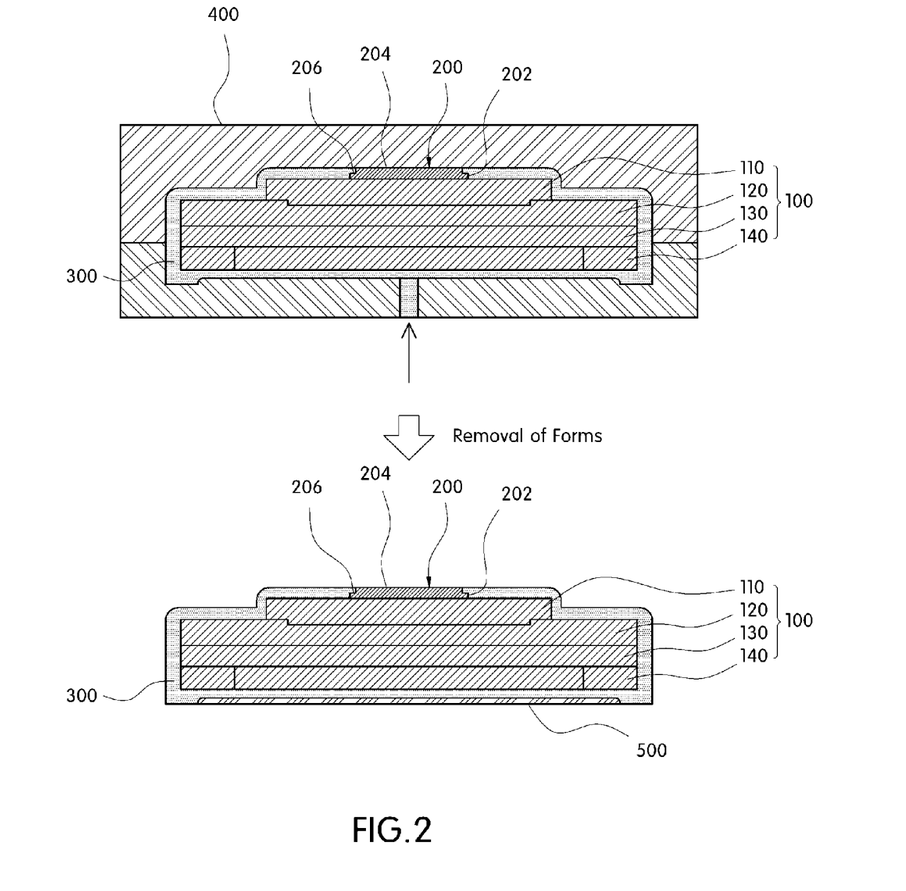
FIG. 2 is a sectional view illustrating a state in which a metal insert of an end plate for a fuel cell is assembled with an anti-bending plate and is injection molded according to the first exemplary embodiment of the present invention.

The anti-bending plate 200 is disposed inside the injection mold while being in close contact with the sandwich insert 100 together with the sandwich insert 100. More specifically, as can be seen in FIG. 2, when the sandwich insert 100 is disposed inside the injection mold 400 in a floated state, a bottom surface of the relatively large diameter portion 202 of the anti-bending plate 200 is in close contact with the outermost plate 110 located at the outermost side of the sandwich insert 100 and an upper surface of the smaller diameter portion 204 is in close contact with an upper surface of the injection mold 400 at the same time.

Subsequently, by injecting a plastic resin into a space between the inner surface of the injection mold 400 and the outer surface of the sandwich insert 100, the outer surface of the sandwich insert 100 is surrounded by the plastic injection molded body 300 so that the sandwich insert is injection molded thereby.

At this time, although a resin pressure is directly applied to the bottom surface of the sandwich insert 100 in the injection molding, the outermost plate 100 of the sandwich insert 100, which corresponds to an opposite surface of the sandwich insert 100, is held and supported by the anti-bending plate 200. Thus, it is possible to easily prevent the sandwich insert 100 from being bent due to the resin pressure.

When the injection mold 400 is removed from the completely injection molded end plate, the upper surface of the smaller diameter portion 204 of the anti-bending plate 200 is exposed to the outside while forming the same plane as the plastic injection molded body 300.

In particular, since the sandwich insert 100 is injection molded while a stepped portion 206 between the relatively large diameter portion 202 and the smaller diameter portion 204 of the anti-bending plate 200 is surrounded by the plastic injection molded body 300, the anti-bending plate 200 is not removed from the sandwich insert 100 and is maintained in a fixed state even after the completion of the injection molding process.

Additionally, a current collector plate 500 for collecting electricity generated in the fuel cell stack is attached to the inner surface of the end plate, e.g., an opposite side of the anti-bending plate 200.

Second Embodiment

Figure 3:
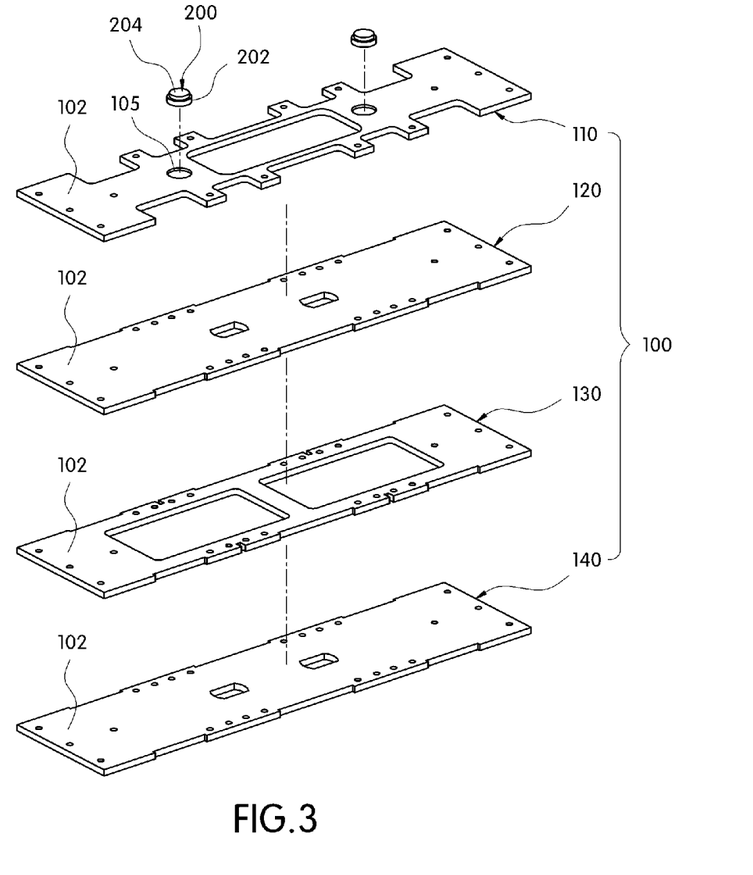
FIG. 3 is an exploded perspective view illustrating a metal insert of an end plate for a fuel cell and an anti-bending plate coupled to the metal insert according to a second exemplary embodiment of the present invention.

As illustrated in FIG. 3, the anti-bending plate 200 according to the second embodiment of the present invention includes a relatively large diameter portion 202 in comparison to a smaller diameter portion 204 which is integrally formed therewith. The relatively large diameter portion 202 is thicker than the smaller diameter portion 204. The relatively large diameter portion 202 is formed at a lower side of the anti-bending plate 200 and the smaller diameter portion 204 is formed at an upper side of the anti-bending plate 200 to form a hat-like shape.

Figure 4:
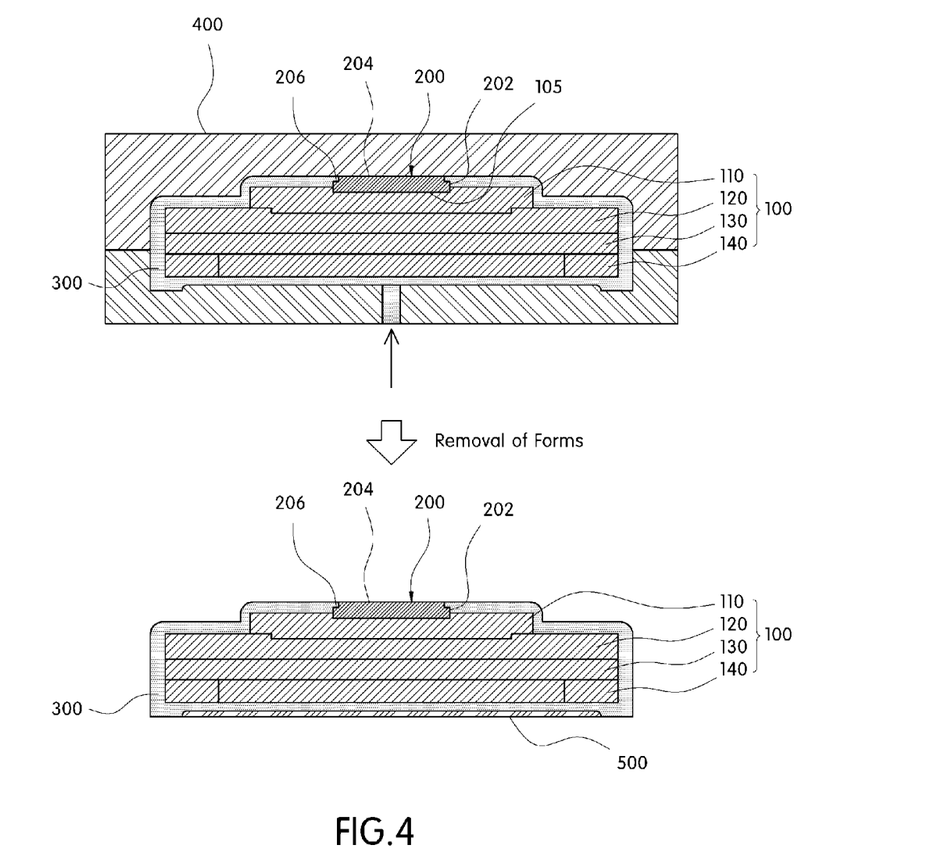
FIG. 4 is a sectional view illustrating a state in which a metal insert of an end plate for a fuel cell is assembled with an anti-bending plate and is injection molded according to the second exemplary embodiment of the present invention.

The anti-bending plate 200 is disposed inside the injection mold while being in close contact with the sandwich insert 100, together with the sandwich insert 100. More particularly, as can be seen in FIG. 4, when the sandwich insert 100 is disposed inside the injection mold 400 in a floated state, a lower end of the large diameter portion 202 of the anti-bending plate 200 is inserted into a coupling recess 105 formed on the outer surface of the outermost plate 110 located at the outermost side of the sandwich insert 100 and an upper surface of the small diameter portion 204 is in close contact with the upper surface of the injection mold 400.

Subsequently, by injecting a plastic resin into a space between the inner surface of the injection mold 400 and the outer surface of the sandwich insert 100, the sandwich insert 100 is surrounded by the plastic injection molded body 300 so that the sandwich insert 100 is injection molded thereby.

At this time, although the resin pressure is directly applied to the bottom surface of the sandwich insert 100 in the injection molding process, the outermost plate 100 of the sandwich insert 100, which corresponds to an opposite surface of the sandwich insert 100, is held and supported by the anti-bending plate 200, so that it is possible to easily prevent the sandwich insert 100 from being bent due to the resin pressure.

When the injection mold 400 is removed from the completely injection molded end plate, the upper surface of the smaller diameter portion 204 of the anti-bending plate 200 is exposed to the outside while forming the same plane as the plastic injection molded body 300. In particular, since the sandwich insert 100 is injection molded while the stepped portion 206 between the relatively large diameter portion 202 and the smaller diameter portion 204 of the anti-bending plate 200 is surrounded by the plastic injection molded body 300, the anti-bending plate 200 is not removed from the sandwich insert 100 and is maintained in a fixed state even after the completion of the injection molding process.

Similarly, the current collector plate 500 for collecting electricity generated in the fuel cell stack is attached to the inner surface of the end plate, e.g., an opposite surface of the anti-bending plate 200.

Third Embodiment

Figure 5:
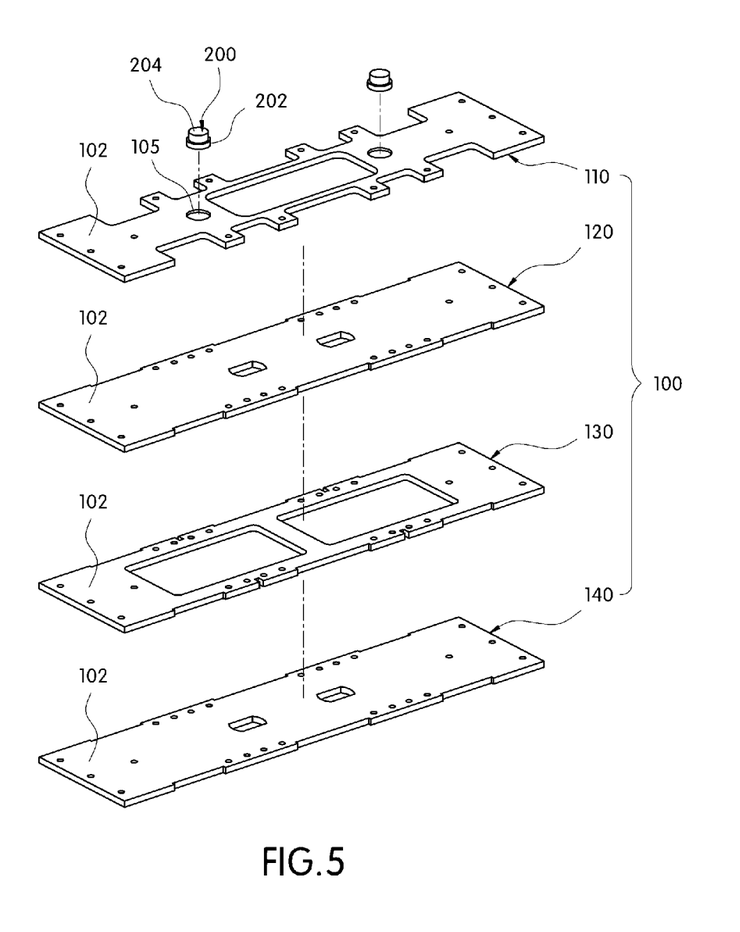
FIG. 5 is an exploded perspective view illustrating a metal insert of an end plate for a fuel cell and an anti-bending plate coupled to the metal insert according to a third exemplary embodiment of the present invention.

As illustrated in FIG. 5, the anti-bending plate 200 according to the third embodiment of the present invention includes a relatively large diameter portion 202 in comparison to a smaller diameter portion 204 which is integrally formed therewith. The smaller diameter portion 204 is thicker than the large diameter portion 202. The relatively large diameter portion 202 at a lower side of the anti-bending plate 200 and the smaller diameter portion 204 at an upper side of the anti-bending plate 200 forms a hat-like shape.

Figure 6:
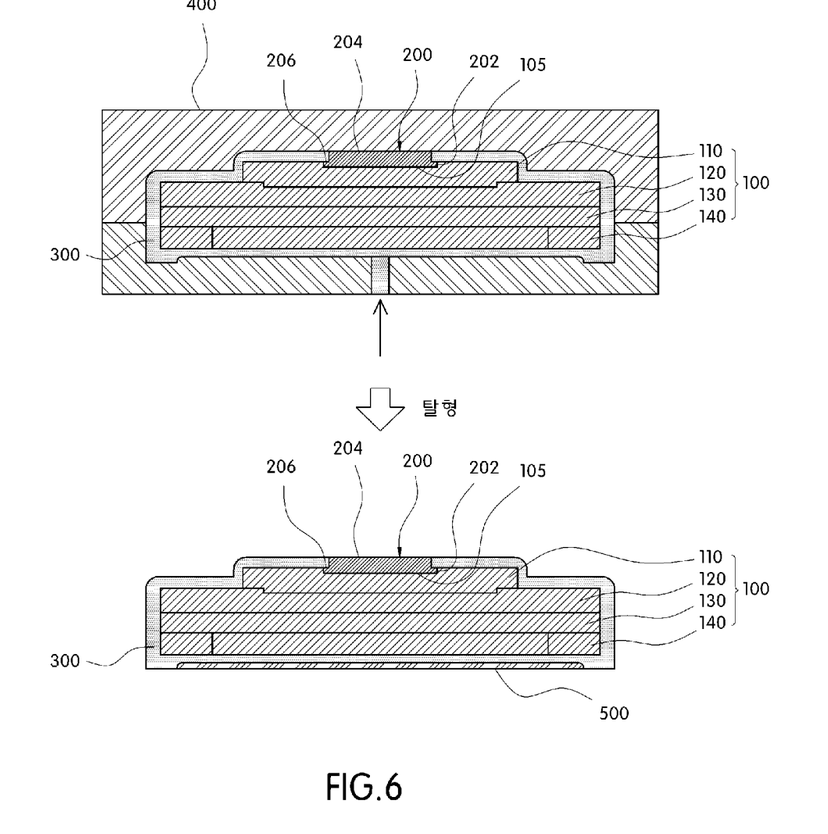
FIG. 6 is a sectional view illustrating a state in which a metal insert of an end plate for a fuel cell is assembled with an anti-bending plate and is injection molded according to the third exemplary embodiment of the present invention.

As can be seen in FIG. 6, when the sandwich insert 100 is disposed inside the injection mold 400 in a floated state, the entire large diameter portion 202 of the anti-bending plate 200 is inserted into the coupling recess 105 formed on the outer surface of the outermost plate 110 located at the outermost side of the sandwich insert 100 and the upper surface of the smaller diameter portion 204 is in close contact with the upper surface of the injection mold 400.

The remaining processes are the same as those of the second embodiment, so that a detailed description thereof will be omitted.

Fourth Embodiment

Figure 7:
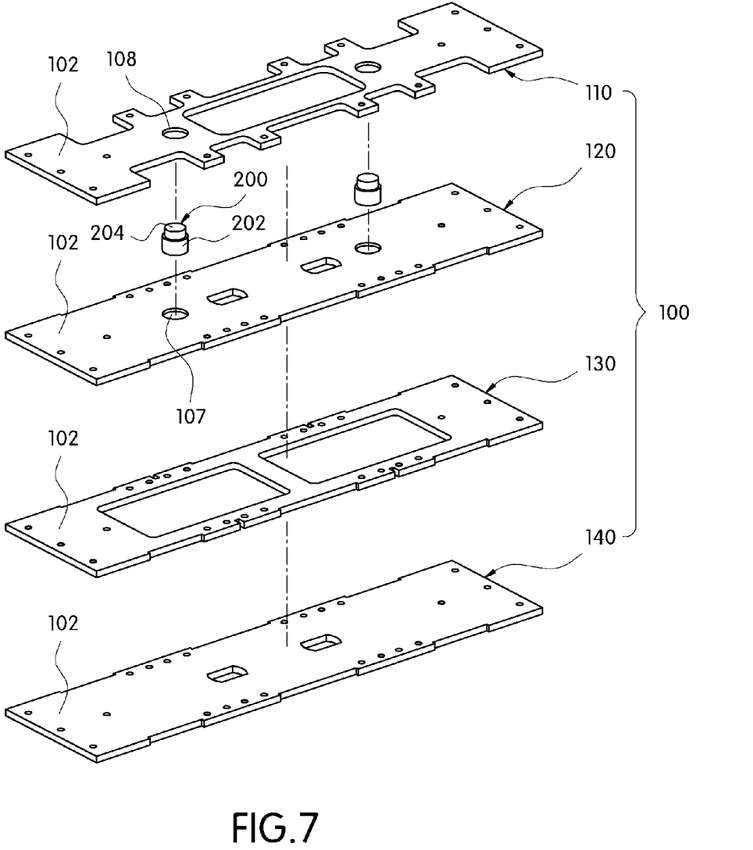
FIG. 7 is an exploded perspective view illustrating a metal insert of an end plate for a fuel cell and an anti-bending plate coupled to the metal insert according to a fourth exemplary embodiment of the present invention.

As illustrated in FIG. 7, the anti-bending plate 200 according to the fourth embodiment of the present invention includes a relatively large diameter portion 202 and a smaller diameter portion 204 which is integrally formed therewith. The smaller diameter portion 204 is thicker than the large diameter portion 202. The integral shape of the large diameter portion 202 at a lower side of the anti-bending plate 200 and the small diameter portion 204 at an upper side of the anti-bending plate 200 form a hat like shape.

Figure 8:
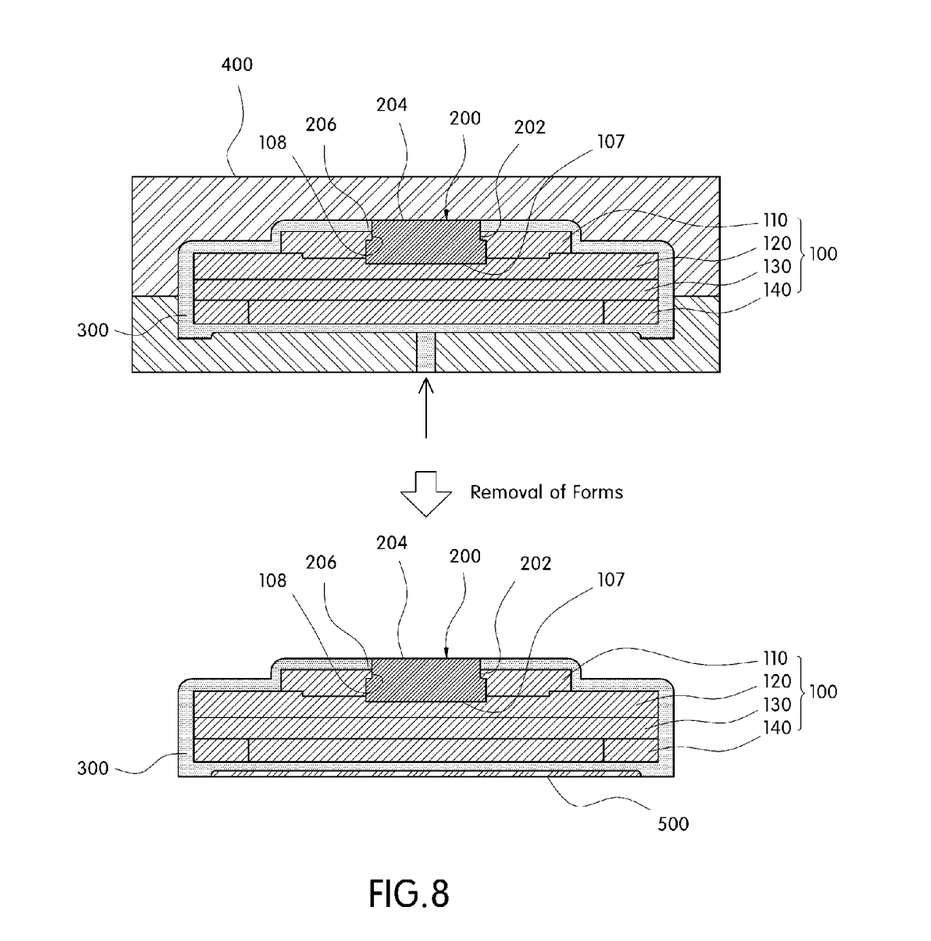
FIG. 8 is a sectional view illustrating a state in which a metal insert of an end plate for a fuel cell is assembled with an anti-bending plate and is injection molded according to the fourth exemplary embodiment of the present invention.

As can be seen in FIG. 8, when the sandwich insert 100 is disposed inside the injection mold 400 in a floated state, a lower end of the large diameter portion 202 is positioned in a positioning recess 107 formed in the second plate 120 located next to the outermost plate 110 of the sandwich insert 100 and the small diameter portion 204 protrudes through a terminal insertion recess 108 formed at the outermost plate 110 at the same time.

At this time, the stepped portion 206 between the relatively large diameter portion 202 and the smaller diameter portion 204 of the anti-bending plate 200 is fixed by the lower surface of the outermost plate 110, to be in a fixed state.

Accordingly, although the resin pressure is directly applied to the bottom surface of the sandwich insert 100 in the injection molding, the outermost plate 100 of the sandwich insert 100, which corresponds to an opposite surface of the sandwich insert 100, is held and supported by the anti-bending plate 200. Thus, it is possible to easily prevent the sandwich insert 100 from being bent due to the resin pressure.

When the injection mold 400 is removed from the completely injection molded end plate, the upper surface of the smaller diameter portion 204 of the anti-bending plate 200 is exposed to the outside while forming the same plane as the plastic injection molded body 300.

In particular, since a stepped portion 206 between the relatively large diameter portion 202 and the smaller diameter portion 204 of the anti-bending plate 200 is secured and locked by the lower surface of the outermost plate 110, the anti-bending plate 200 is not removed from the sandwich insert 100 and is maintained in a secured state even after the completion of the injection molding process.

Similarly, the current collector plate 500 for collecting electricity generated in the fuel cell stack is attached to the inner surface of the end plate, e.g., an opposite surface of the anti-bending plate 200.

What is claimed is:

1. An end plate for a fuel cell comprising:
a sandwich insert in which a plurality of plates having manifold forming portions at opposite ends thereof are bonded by a bonding means; and
an anti-bending plate that is in close contact with a surface of an injection mold, the anti-bending plate coupled to a surface of the sandwich insert opposite to where a resin pressure is directly applied during injection molding; and
a plastic injection molded body which is injection molded after surrounding the sandwich insert with a plastic injection molding material,
wherein the sandwich insert to which the resin pressure is applied within the injection mold is supported by the anti-bending plate,
wherein the sandwich insert is a metal insert including at least one plate having one or more material-reducing spaces;
wherein the anti-bending plate is a hat-like shape having a large diameter portion at a lower side of the anti-bending plate and a smaller diameter portion at an upper side of the anti-bending plate, and the large diameter portion of the anti-bending plate is in contact with the outermost plate of the sandwich insert,
wherein the upper surface of the smaller diameter portion of the anti-bending plate is exposed to the outside of the end plate,
wherein a stepped portion between the large diameter portion and the smaller diameter portion is locked by the plastic injection molded body.

2. The end plate of claim 1, wherein the large diameter portion and the smaller diameter portion have a same thickness and are integrally formed therewith, a lower surface of the large diameter portion is in close contact with an outer surface of an outermost plate located at an outermost side of the sandwich insert to be injection molded.

3. The end plate of claim 1, wherein the large diameter portion and the smaller diameter portion are integrally formed therewith, the large diameter portion thicker than the smaller diameter portion, a lower end of the large diameter portion is inserted into a coupling recess formed on an outer surface of an outermost plate located at an outermost side of the sandwich insert.

4. The end plate of claim 1, wherein the large diameter portion and the smaller diameter portion that is thicker than the large diameter portion-are integrally formed therewith, the large diameter portion is inserted into a coupling recess formed at an outer surface of an outermost plate located at an outermost side of the sandwich insert.

5. The end plate of claim 1, wherein the large diameter portion the smaller diameter portion that is thicker than the relatively large diameter portion are integrally formed therewith, a lower end of the large diameter portion is positioned within a positioning recess formed in a second plate located next to an outermost plate of the sandwich insert and the smaller diameter portion protrudes through a terminal insertion recess formed in the outermost plate at the same time.

6. A fuel cell stack comprising:
a membrane electrode assembly;
a plurality of gas diffusion layers and gaskets;
a two or more end plate configured to secure the membrane electrode assembly, the plurality of gas diffusion layers and gaskets as a fuel cell stack,
wherein each end plate includes:
an insert in which a plurality of plates having manifold forming portions at opposite ends thereof are bonded;
anti-bending plates that are in close contact with a surface of an injection mold that is coupled to a surface of the insert opposite to where a resin pressure is directly applied during injection molding; and
a plastic injection molded body which is injection molded after surrounding the sandwich insert with a plastic injection molding material, wherein the insert to which the resin pressure is applied within the injection mold is supported by the anti-bending plate, wherein the insert is a metal sandwich insert including at least one plate having one or more material-reducing spaces, wherein the anti-bending plate is a hat-like shape having a large diameter portion at a lower side of the anti-bending plate and a smaller diameter portion at an upper side of the anti-bending plate, and the large diameter portion of the anti-bending plate is in contact with the outermost plate of the sandwich insert, wherein the upper surface of the smaller diameter portion of the anti-bending plate is exposed to the outside of the end plate, wherein a stepped portion between the large diameter portion and the smaller diameter portion is locked by the plastic injection molded body.

7. The fuel cell stack of claim 6, wherein the large diameter portion and the smaller diameter portion have a same thickness and are integrally formed therewith, a lower surface of the large diameter portion is in close contact with an outer surface of an outermost plate located at an outermost side of the sandwich insert to be injection molded.

8. The fuel cell stack of claim 6, wherein the large diameter portion and the smaller diameter portion are integrally formed therewith, the large diameter portion thicker than the smaller diameter portion, a lower end of the large diameter portion is inserted into a coupling recess formed on an outer surface of an outermost plate located at an outermost side of the sandwich insert.

9. The fuel cell stack of claim 7, wherein the large diameter portion and the smaller diameter portion that is thicker than the large diameter portion are integrally formed therewith, the large diameter portion is inserted into a coupling recess formed at an outer surface of an outermost plate located at an outermost side of the sandwich insert.

10. The fuel cell stack of claim 7, wherein the large diameter portion the smaller diameter portion that is thicker than the large diameter portion are integrally formed therewith, a lower end of the large diameter portion is positioned within a positioning recess formed in a second plate located next to an outermost plate of the sandwich insert and the smaller diameter portion protrudes through a terminal insertion recess formed in the outermost plate at the same time.

* * * * *